W. BURGESS.
Mowing and Reaping Machine.
No. 13,565.
2 Sheets—Sheet 1.
Patented Sept. 18, 1855.
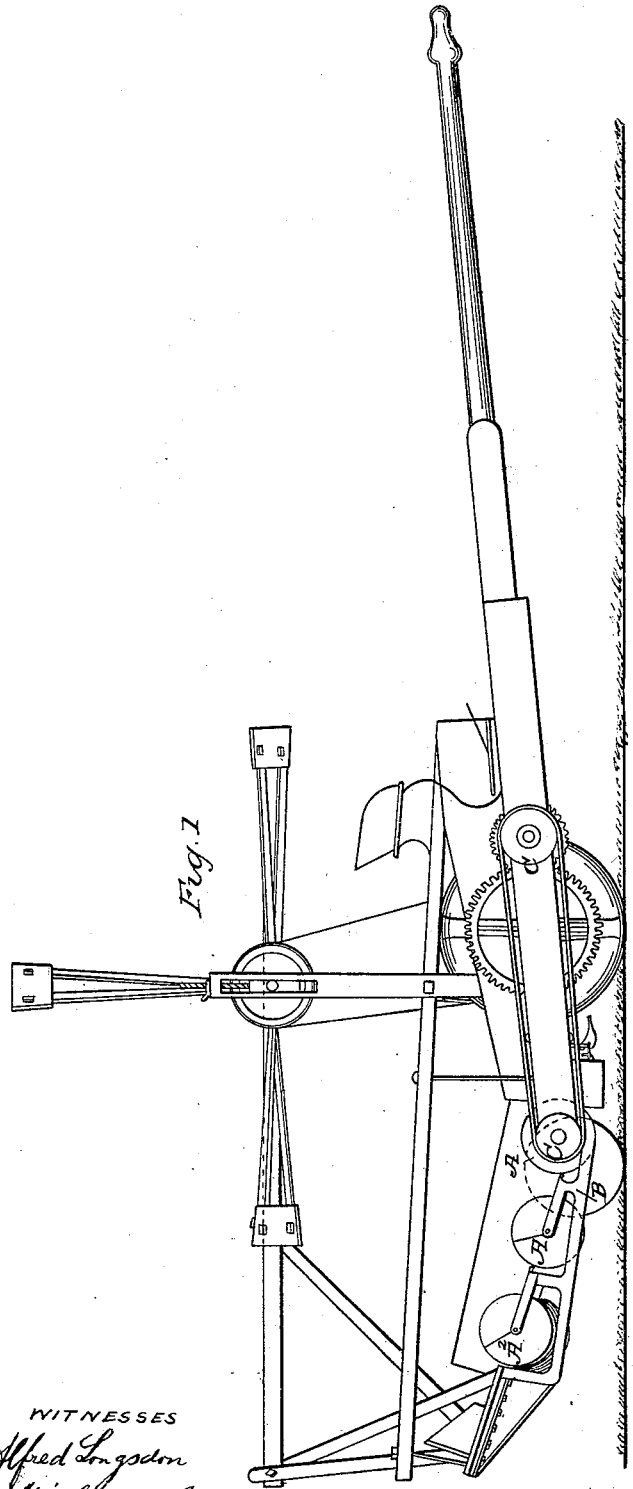
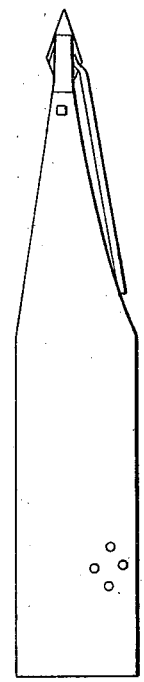
WITNESSES
Alfred Longsdon
Michael Henry
INVENTOR
Wm Burgess W. BURGESS.
Mowing and Reaping Machine.
No. 13,565.
2 Sheets—Sheet 2.
Patented Sept. 18, 1855.
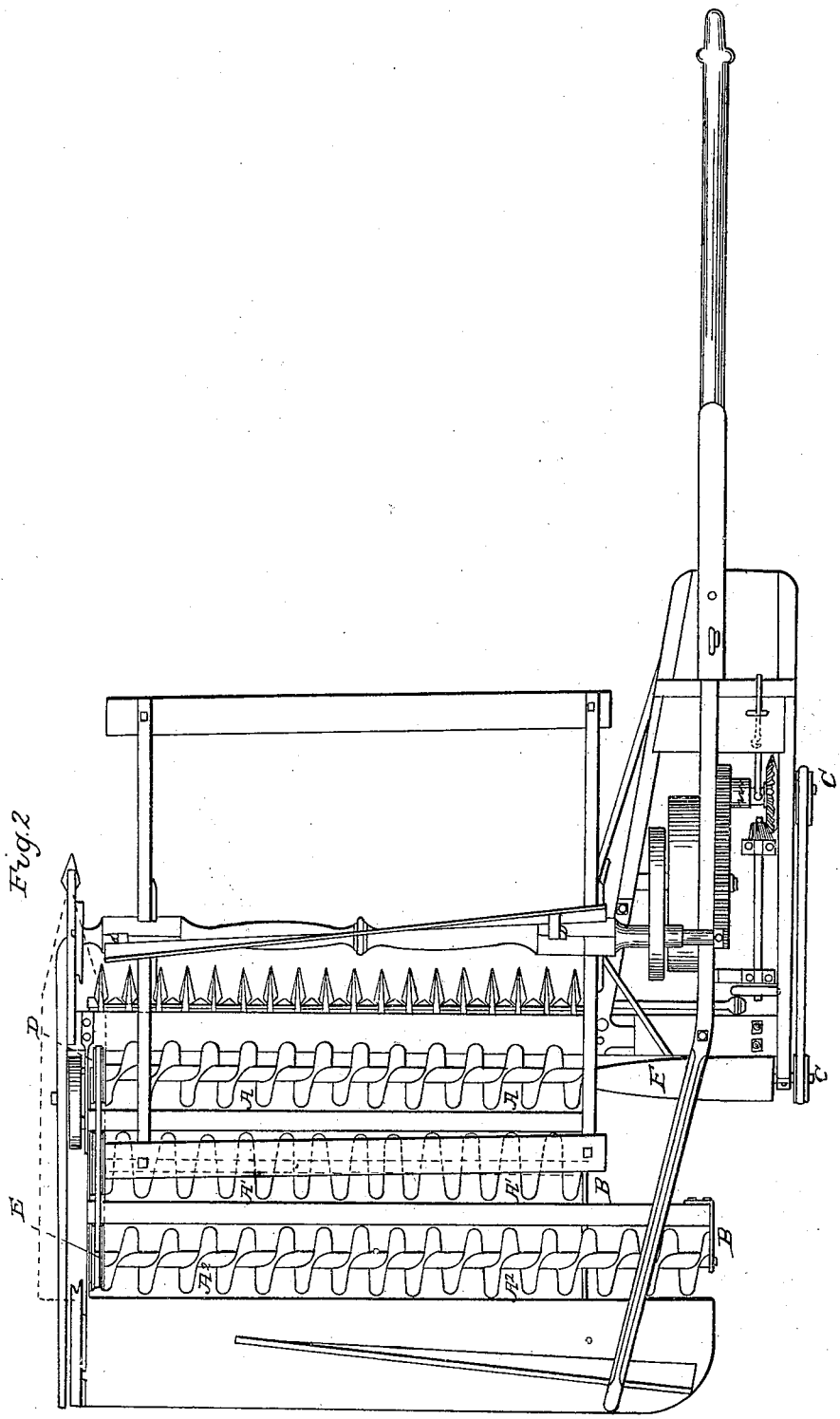
WITNESSES
Alfred Longsdon
Michael Henry
INVENTOR
Wm Burgess

UNITED STATES PATENT OFFICE.

WILLIAM BURGESS, OF LONDON, ENGLAND.

IMPROVEMENT IN MOWING AND REAPING MACHINES.

Specification forming part of Letters Patent No. 13,565, dated September 18, 1855.

*To all whom it may concern:*

Be it known that I, WILLIAM BURGESS, of the firm of Burgess & Key, of Newgate street, in the city of London, agricultural engineers, have invented an Improvement in or Addition to Reaping and Mowing Machines; and I do hereby declare that the following is a full and exact description thereof, reference being had to the accompanying drawings, and to the figures and letters thereon.

My invention consists in the employment or adaptation of one or more Archimedean screws to the platform or other convenient part of reaping and mowing machines for the purpose of delivering the cut crop to the side of the machine or to remove it therefrom, motion being communicated to such screws from some running part or parts of such machine. In the annexed drawings I have shown screws so fitted as to deliver the cut crop off the side of the machine.

Figure 1 of the drawings annexed is a side elevation, and Fig. 2 a plan, of a reaping-machine, to the platform of which three Archimedean screws, $A$ $A'$ $A^2$, are fitted.

$B$ $B$ are side frames, bolted or otherwise fastened to the platform, in which side frames are bearings for the axes of the screws. The screw $A$ is driven by a strap from a rigger, $C$, affixed on or driven by some running part of the machine. The screw $A'$ receives motion from a band and rigger, $D$, mounted on the axis of the screw $A$, while the screw $A^2$ receives motion from a band which works over a rigger, $E$, mounted on its axis, and over the rigger $D$. On the shaft of the screw $A$, I fit a conical guard, $F$, to assist in laying the cut crop. On the reaper being set to work, the crop will be directed onto the platform by the reel, when the screws will deliver it off from the machine.

Although I have shown the platform provided with three screws, I do not limit myself to that number, as circumstances may render it desirable to use more or less. Neither do I confine myself to the mode of setting the screws in motion, so long as such motion is communicated from some running part or parts of the machine; and as I find the best results to be obtained from the screw $A^2$ being longer than the others, I have so shown it in my drawings; yet for some description of crops and from some particular circumstances it may not be found necessary to adopt this construction. Therefore I do not limit myself to the precise proportions shown.

I am aware that a spiral or screw has been employed for the purpose of clearing the track in order that the wheels may operate upon the ground, and I make no claim to such a device; but I do claim as my improvement in or addition to reaping and mowing machines—

Combining the Archimedean screws with the platform thereof for the purpose of delivering the cut crop off from the same, substantially in the manner as described.

In witness whereof I, the said WILLIAM BURGESS, have hereunto set my hand this 17th day of April, 1855.

WM. BURGESS.

Witnesses:
 ALFRED LONGSDON,
 MICHAEL HENRY,
  *Both of 166 Fleet Street, London.*